United States Patent
Blanc et al.

(10) Patent No.: US 7,975,016 B2
(45) Date of Patent: Jul. 5, 2011

(54) METHOD TO MANAGE HIGH AVAILABILITY EQUIPMENTS

(75) Inventors: Florence Blanc, Eybens (FR); Isabelle Colas, Courbevoie (FR); Xavier Vigouroux, Brie et Angonnes (FR)

(73) Assignee: Oracle America, Inc., Redwood City, CA (US)

( * ) Notice: Subject to any disclaimer, the term of this patent is extended or adjusted under 35 U.S.C. 154(b) by 953 days.

(21) Appl. No.: 10/493,857

(22) PCT Filed: Oct. 29, 2001

(86) PCT No.: PCT/IB01/02020
§ 371 (c)(1),
(2), (4) Date: Oct. 29, 2004

(87) PCT Pub. No.: WO03/039071
PCT Pub. Date: May 8, 2003

(65) Prior Publication Data
US 2005/0055418 A1 Mar. 10, 2005

(51) Int. Cl.
*G06F 15/16* (2006.01)
(52) U.S. Cl. ...................... 709/208; 709/209
(58) Field of Classification Search .................. 709/208, 709/224, 209
See application file for complete search history.

(56) References Cited

U.S. PATENT DOCUMENTS

| | | | |
|---|---|---|---|
| 5,452,419 A * | 9/1995 | Di Giulio et al. | 709/200 |
| 5,805,785 A * | 9/1998 | Dias et al. | 714/4 |
| 5,951,683 A * | 9/1999 | Yuuki et al. | 713/1 |
| 5,956,515 A * | 9/1999 | Beals et al. | 717/170 |
| 5,959,969 A * | 9/1999 | Croslin et al. | 370/216 |
| 6,108,699 A * | 8/2000 | Moiin | 709/221 |
| 6,243,826 B1 * | 6/2001 | Quoc et al. | 714/4 |
| 6,330,605 B1 * | 12/2001 | Christensen et al. | 709/226 |
| 6,353,898 B1 * | 3/2002 | Wipfel et al. | 714/48 |
| 6,363,416 B1 * | 3/2002 | Naeimi et al. | 709/209 |
| 6,532,494 B1 * | 3/2003 | Frank et al. | 709/224 |
| 6,868,442 B1 * | 3/2005 | Burdeau | 709/223 |
| 7,269,648 B1 * | 9/2007 | Krishnan et al. | 709/224 |
| 2002/0083187 A1 * | 6/2002 | Sim et al. | 709/235 |
| 2003/0037283 A1 * | 2/2003 | Srinivasan et al. | 714/11 |
| 2003/0041138 A1 * | 2/2003 | Kampe et al. | 709/223 |

FOREIGN PATENT DOCUMENTS

WO    WO01/75677    10/2001

OTHER PUBLICATIONS

Young-pa So, et al; "Distributed Big Brother;" Department of Electrical Engineering and Computer Science; University of Michigan; pp. 295-301.

* cited by examiner

*Primary Examiner* — Jeffrey Pwu
*Assistant Examiner* — Shaq Taha
(74) *Attorney, Agent, or Firm* — Osha • Liang LLP

(57) ABSTRACT

The invention relates to a method of managing a distributed computer system, comprising a group of nodes. The method comprises the following steps: a. sending a candidates master message from a given one of the node to other nodes in the group (906), b. recording receipt in the given node of candidate master messages from other nodes, until a first end-of-receipt condition is met, and c. upon receipt of candidate master message from other nodes at step b., starting in the given node a master election scheme between the given node and such other nodes having sent candidate master messages. The invention also relates to a corresponding distributed computer system.

10 Claims, 13 Drawing Sheets

METHOD TO MANAGE HIGH AVAILABILITY EQUIPMENTS

The invention relates to network equipments, more particularly to such equipments as used in telecommunication network systems.

Telecommunication users may be connected between them or to other telecommunication services through a succession of equipments, which may comprise terminal devices, base stations, base station controllers, and an operation management center, for example. Base station controllers usually comprise nodes exchanging data on a network.

A requirement in such a telecommunication network system is to provide a high availability, e.g. in comprising a specific node ensuring a good serviceability and a good failure maintenance. A pre-requisite is then to have a mechanism to designate this specific node. Such a designation mechanism arises problems such as, for example, being compatible with node failure conditions comprising the need to stop certain equipments for maintenance and/or repair, or having necessary information on operational nodes.

Thus, the known Transmission Control Protocol (TCP) has a built-in capability to detect network failure. However, this built-in capability involves potentially long and unpredictable delays. On another hand, the known User Datagram Protocol (UDP) has no such capability.

A general aim of the present invention is to provide advances with respect to such mechanisms.

The invention concerns a method of managing a distributed computer system, comprising a group of nodes, said method comprising the following steps:
a. sending a candidate master message from a given one of the node to other nodes in the group,
b. recording receipt in the given node of candidate master messages from other nodes, until a first end-of-receipt condition is met, and
c. upon receipt of candidate master messages from other nodes at step b., starting in the given node a master election scheme between the given node and such other nodes having sent candidate master messages.

The invention also concerns a distributed computer system, comprising a group of nodes, at least a given node of the group of nodes having code defining a master election function arranged for sending a candidate master message to other nodes in the group of nodes, for recording receipt in the given node of candidate master messages from other nodes until a first end-of-receipt is met and, upon receipt of candidate master messages from other nodes, for starting in the given node a master election scheme between the given node and such other nodes having sent candidate master messages.

Figure 1:
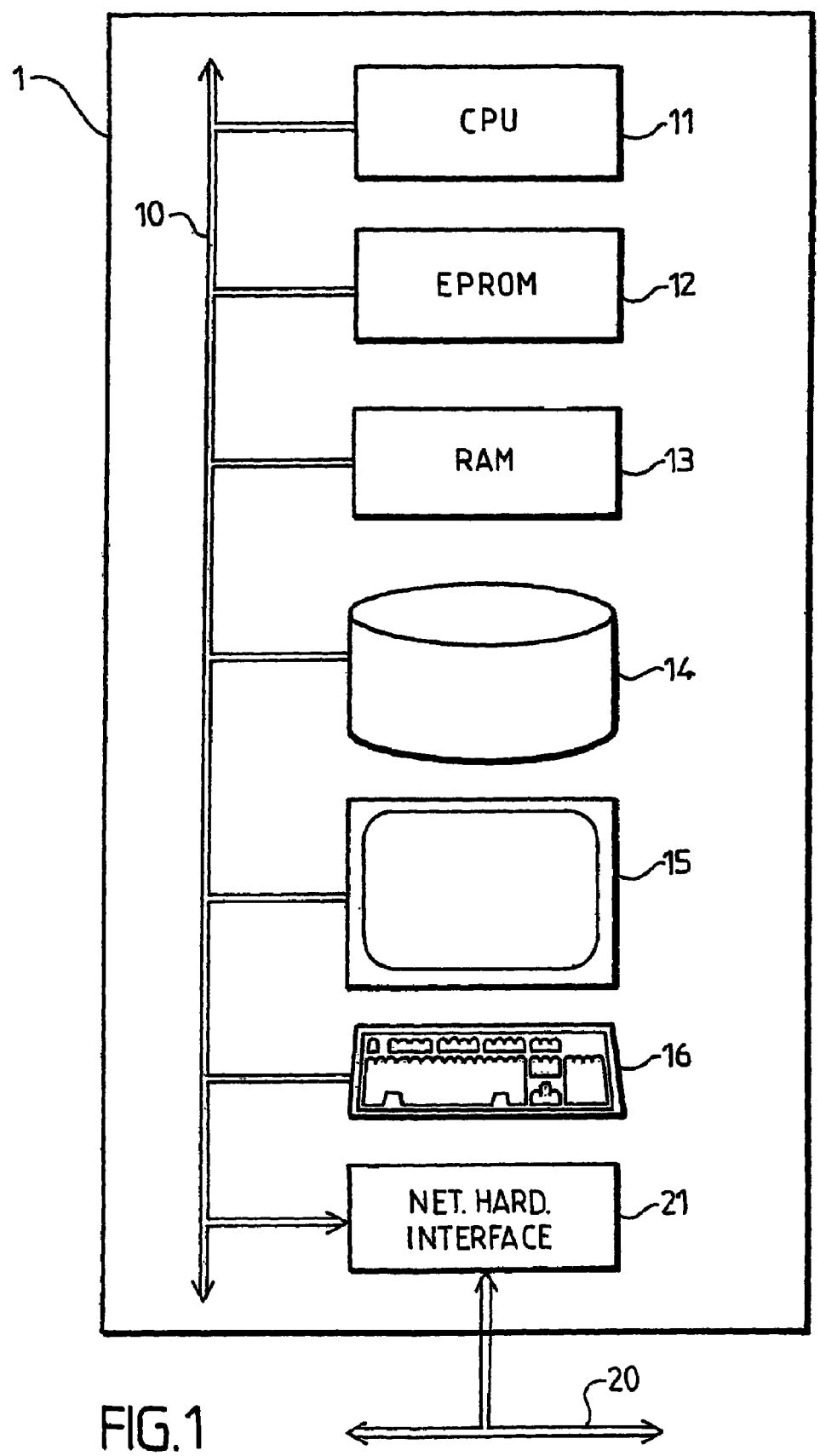
Figure 2:
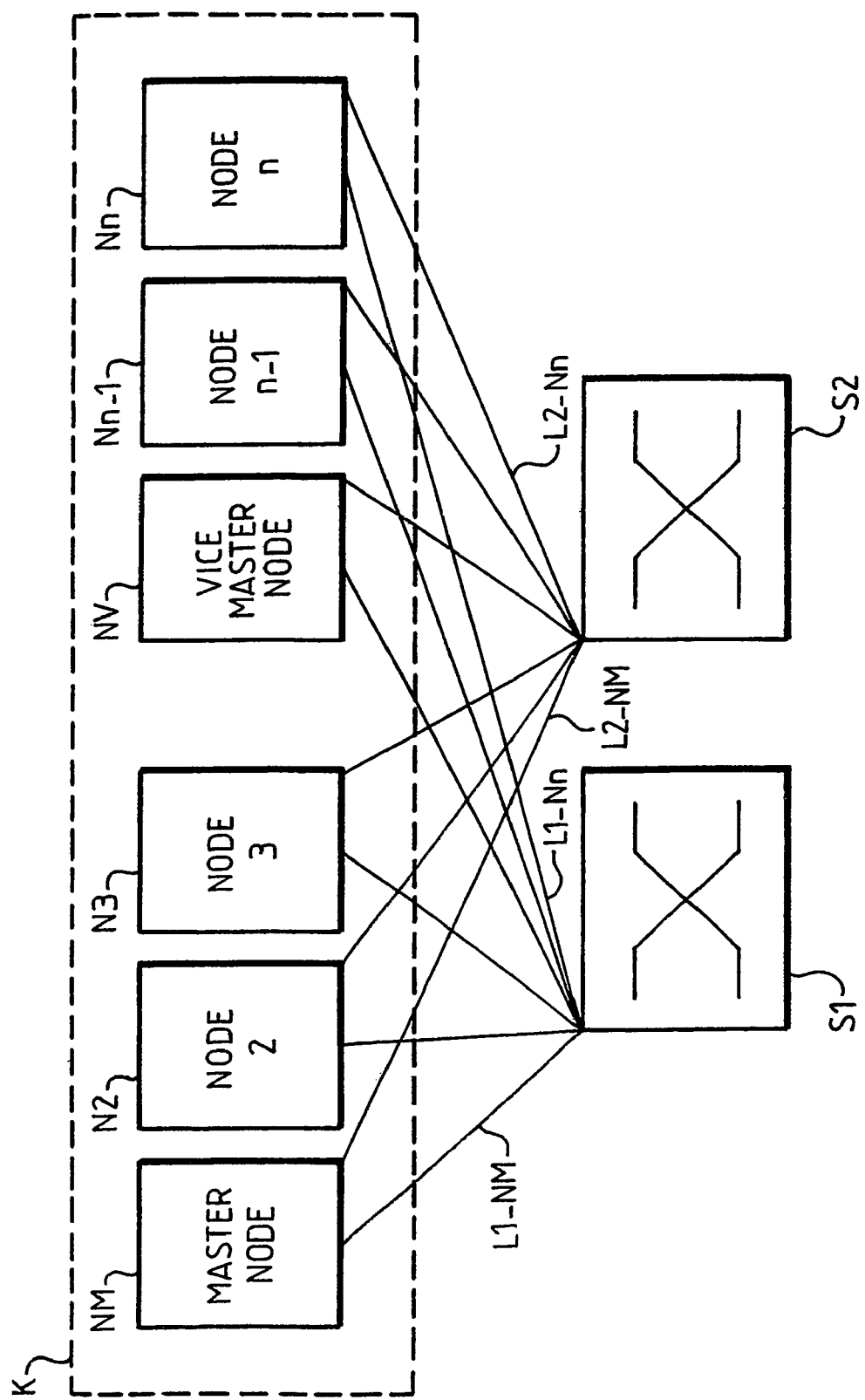
Figure 3:
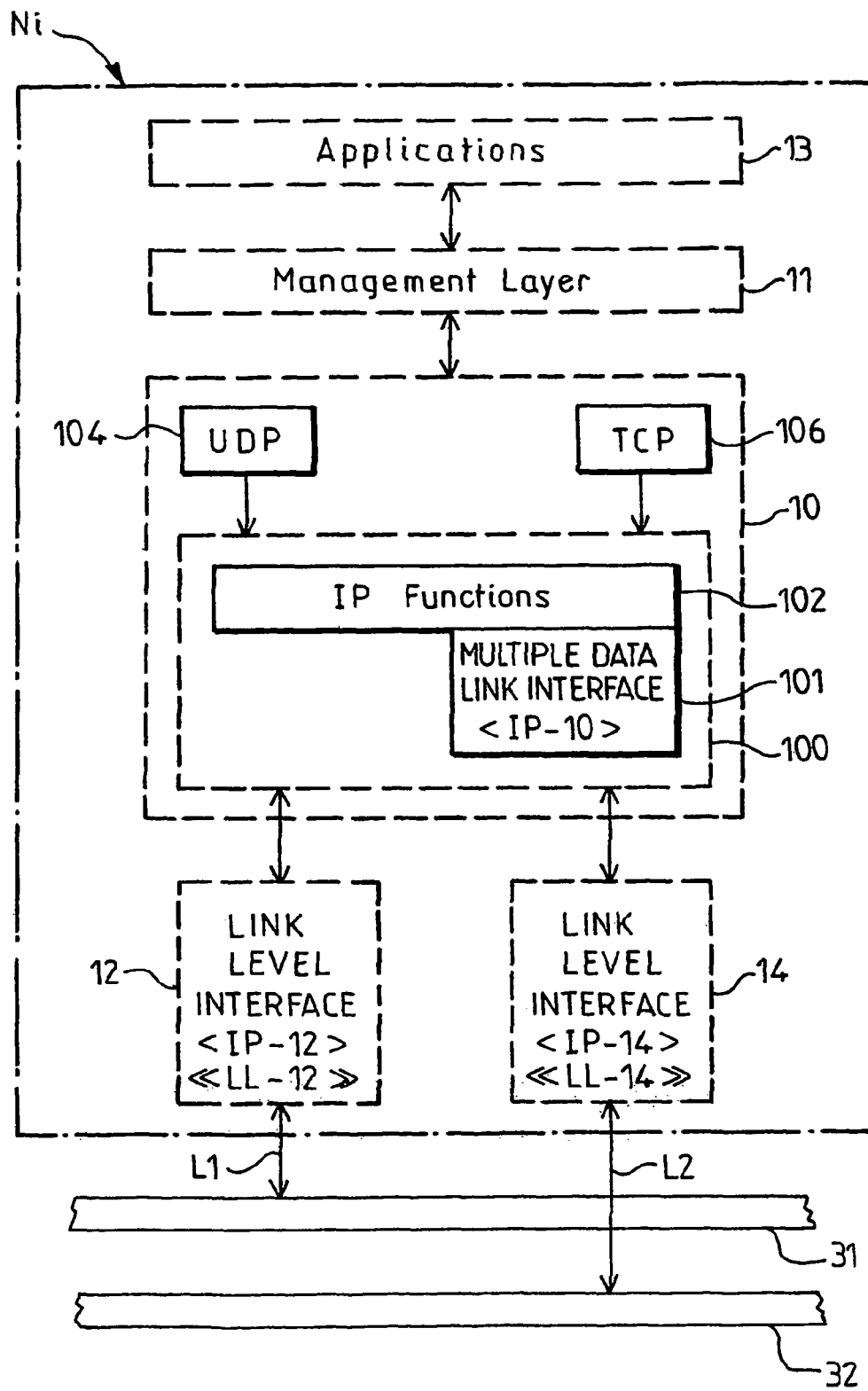
Figure 4:
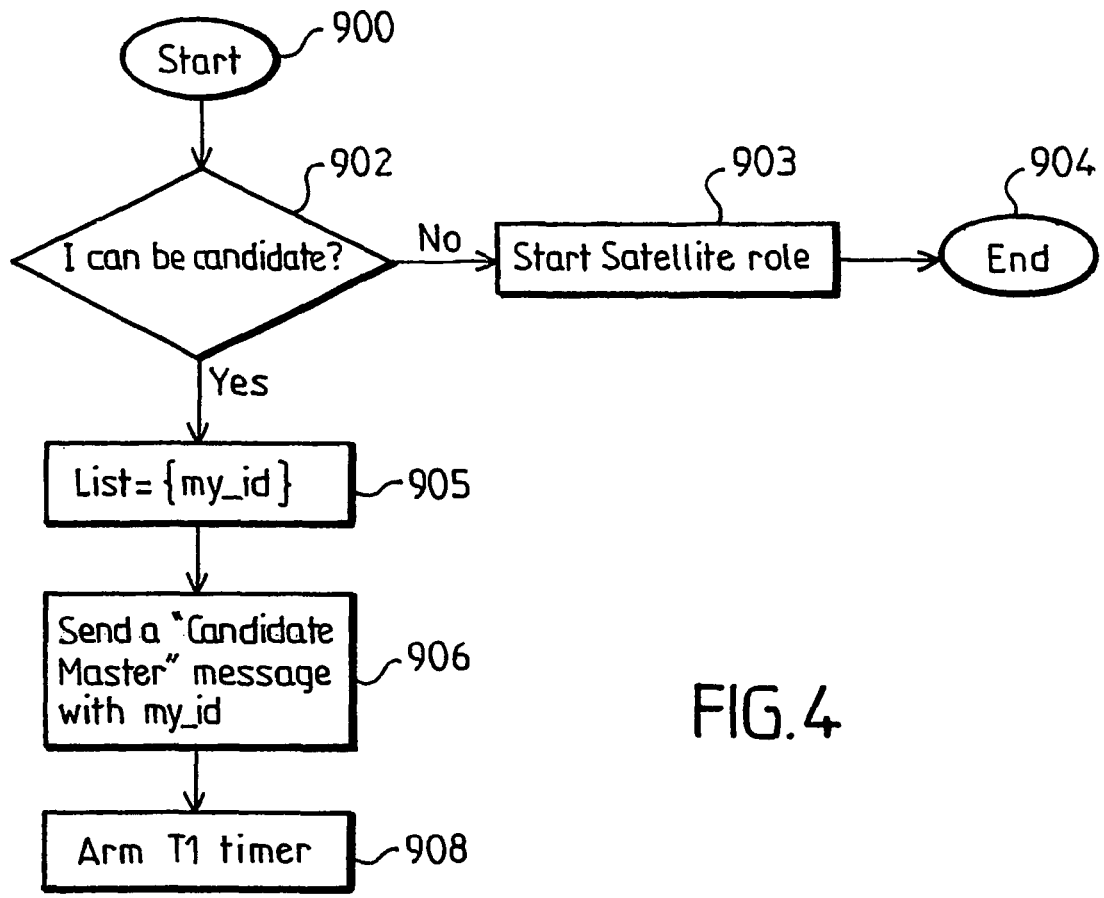
Figure 5:
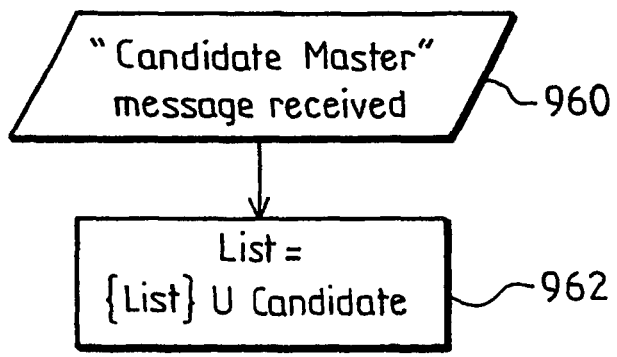
Figure 6:
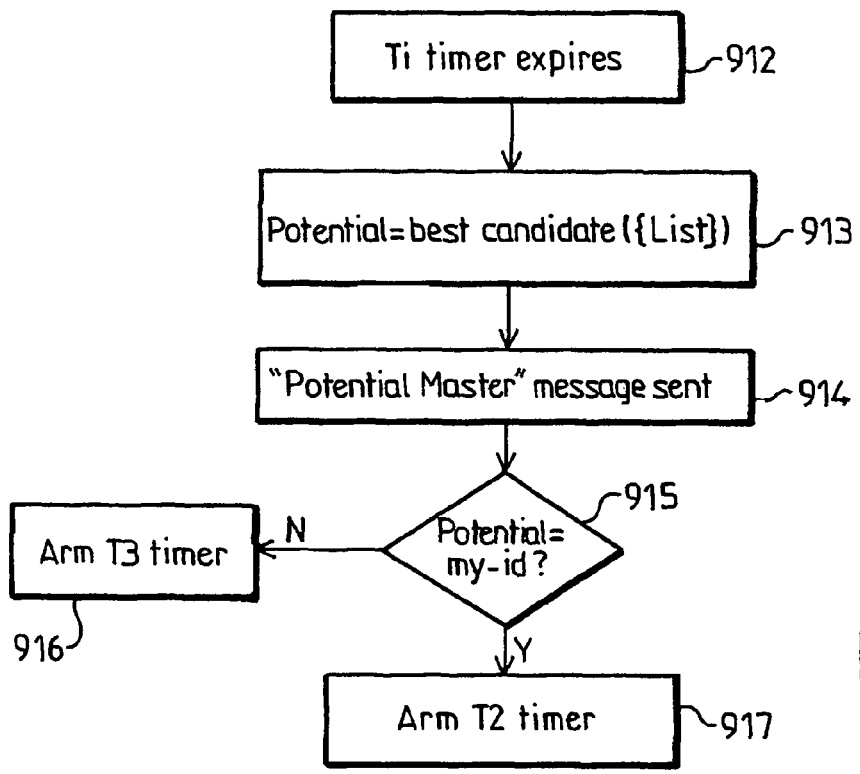
Figure 7:
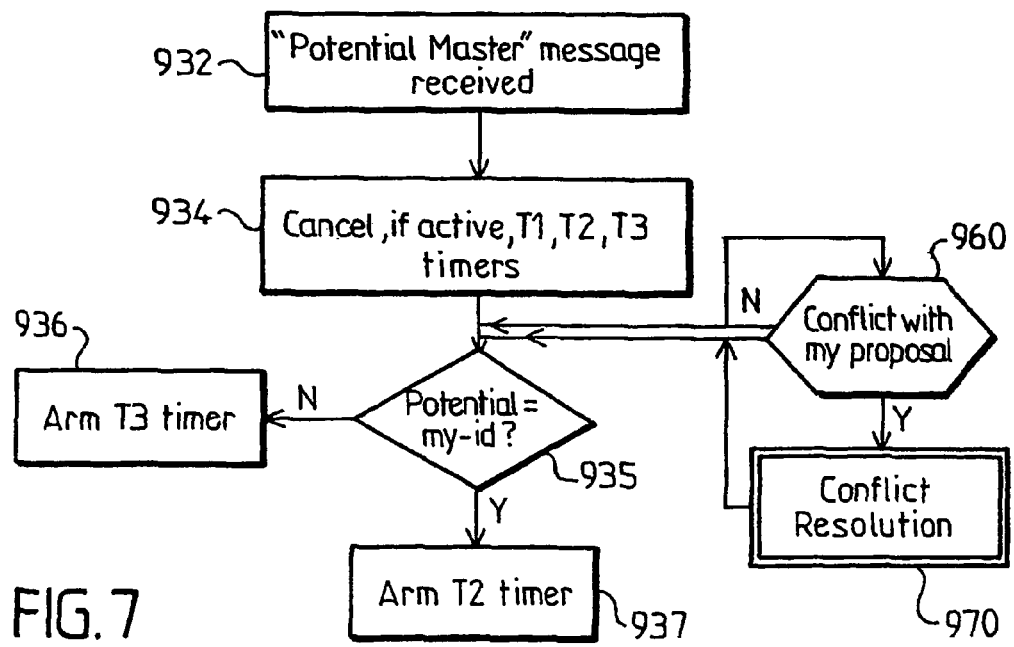
Figure 7:
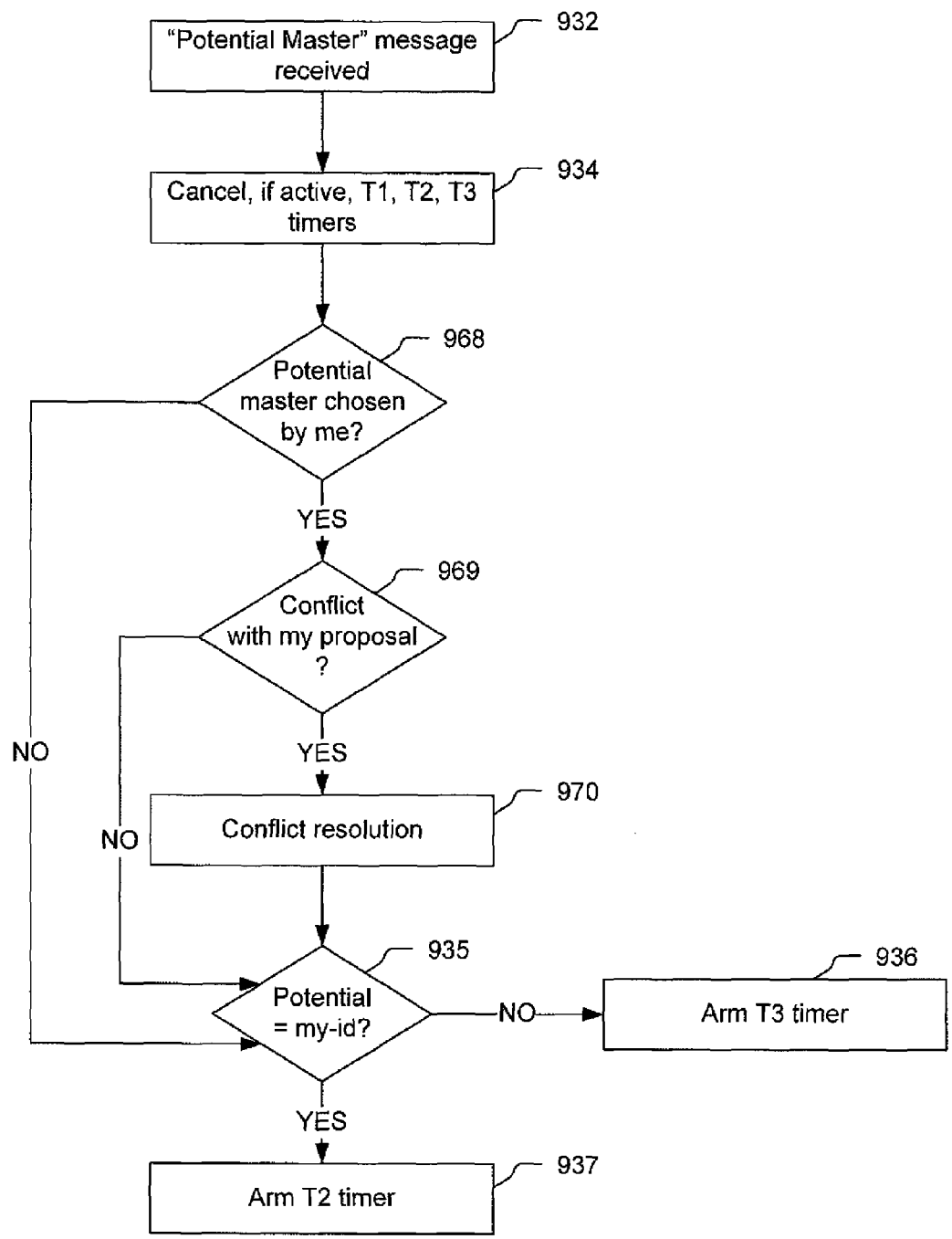
Figure 8:
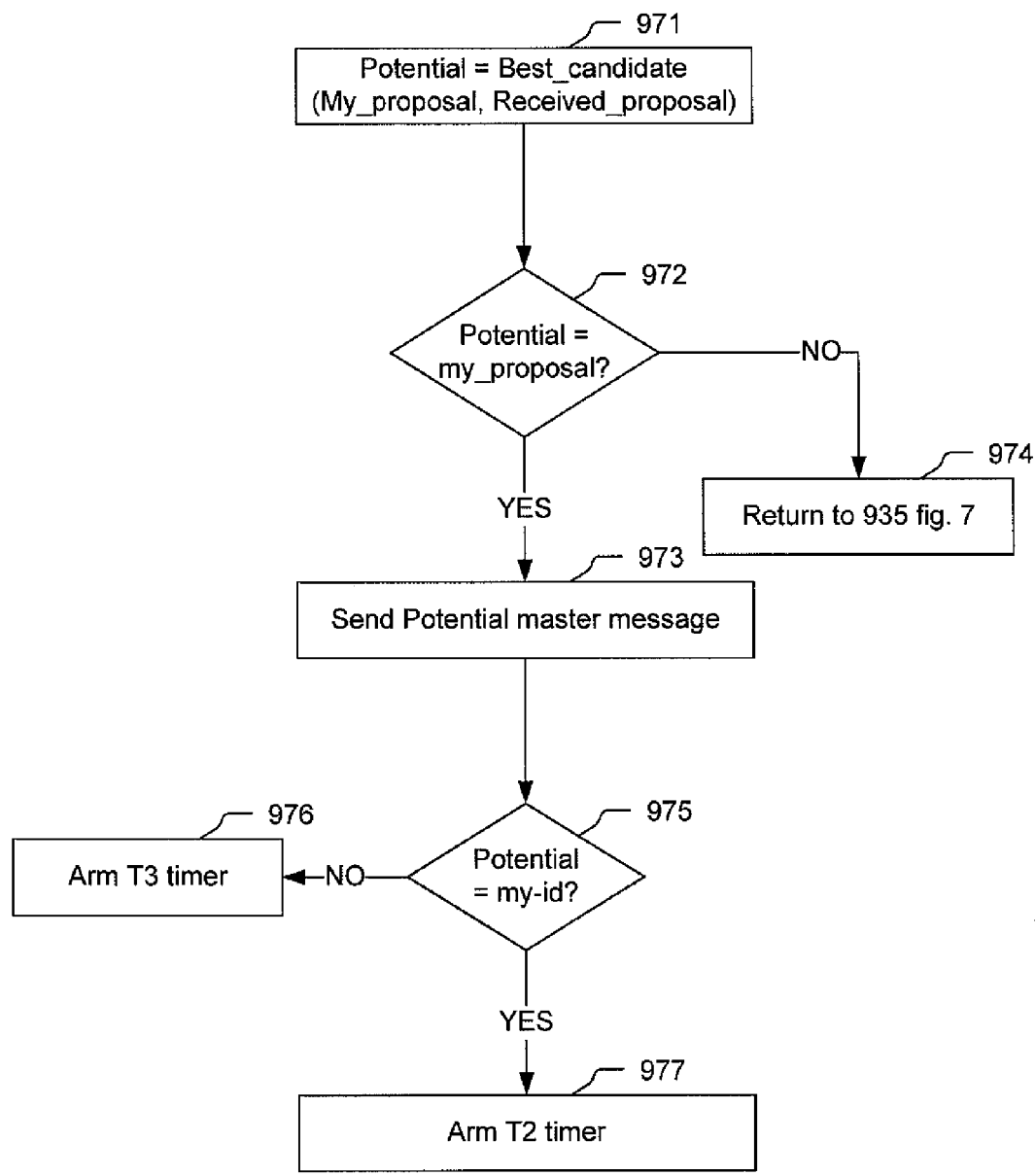
Figure 9:
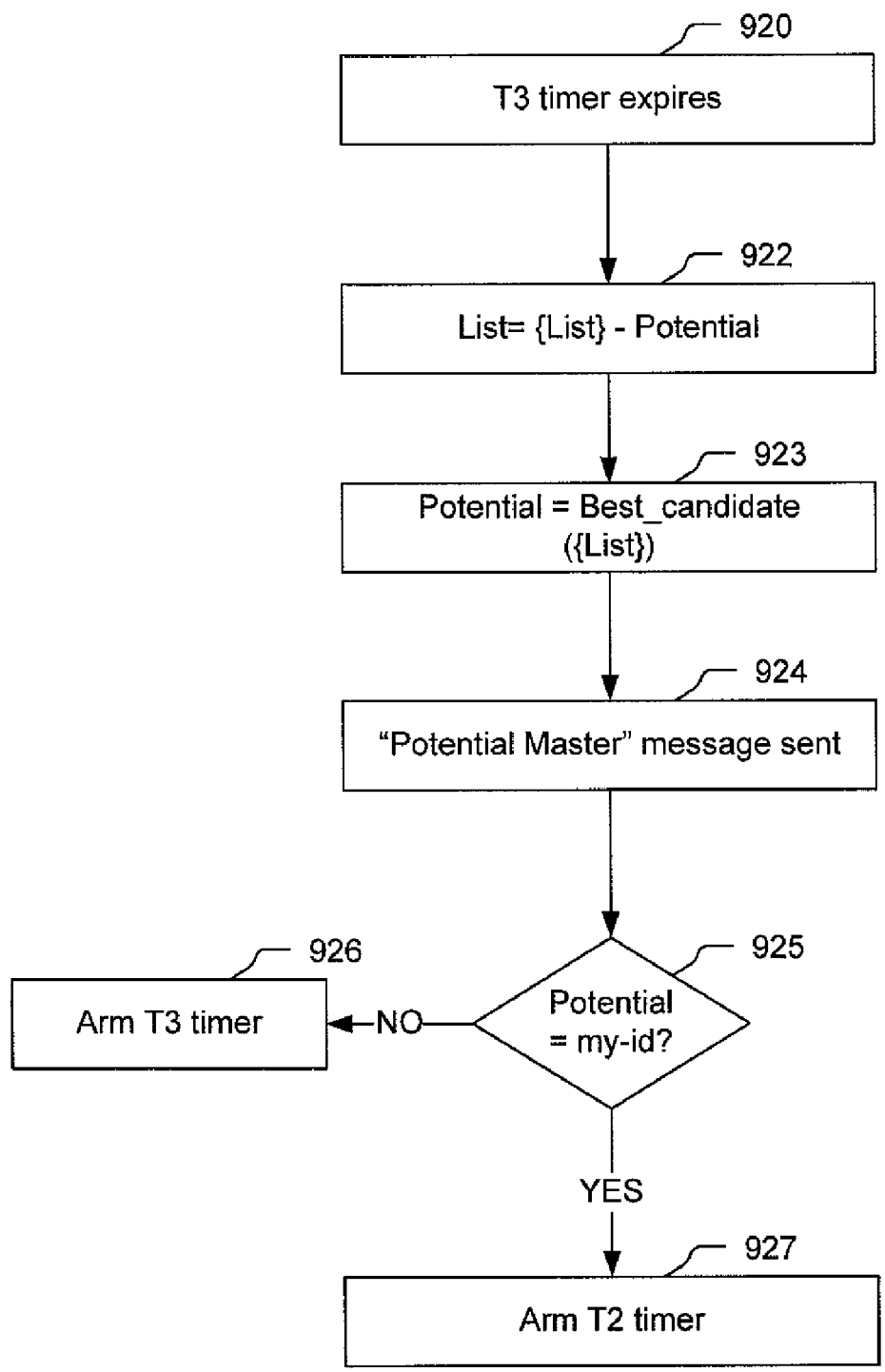
Figure 10:
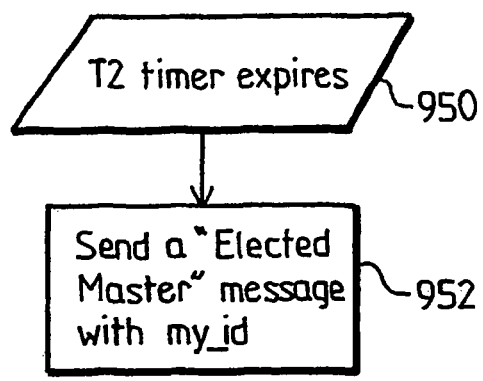
Figure 11:
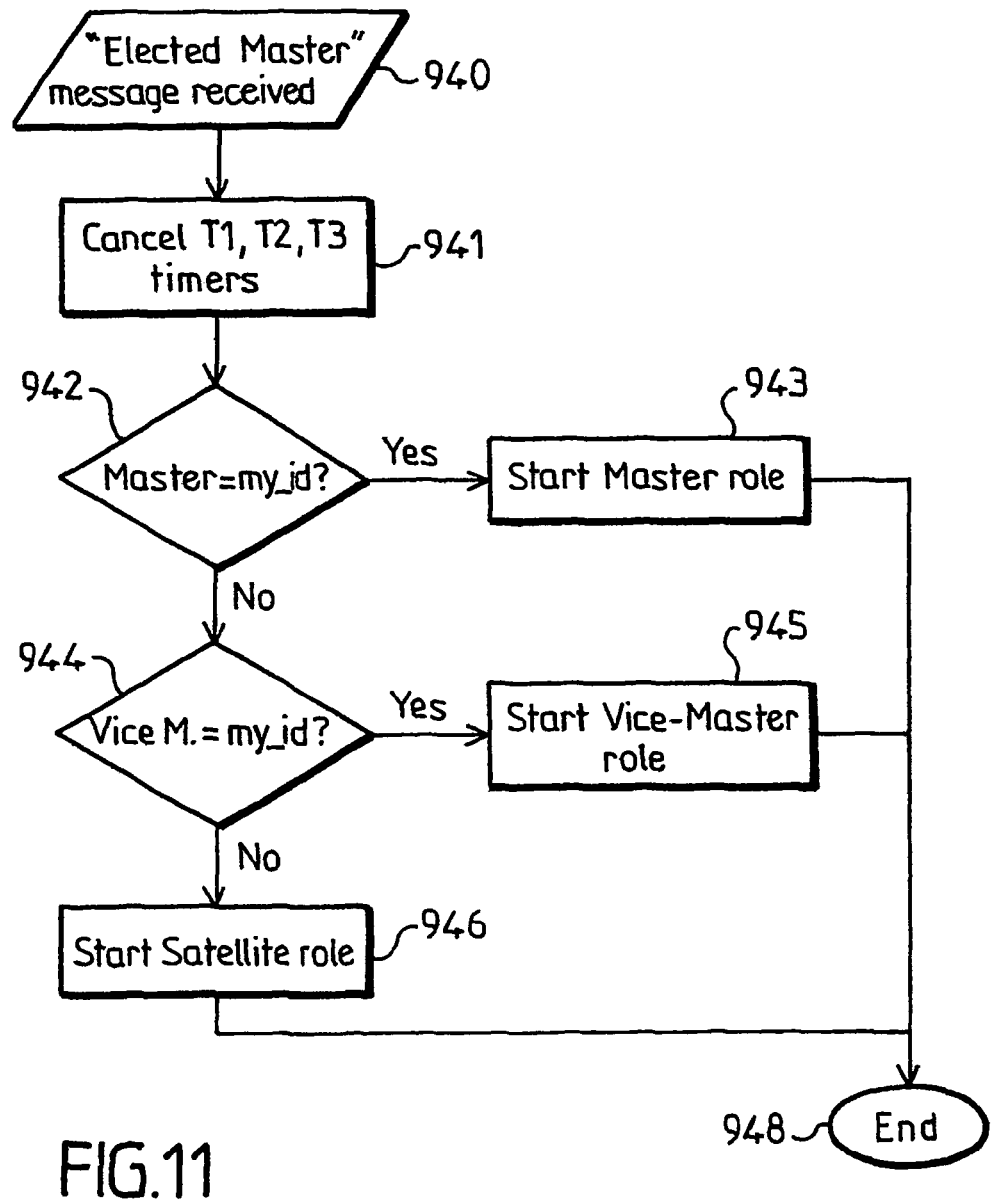
Figure 12:
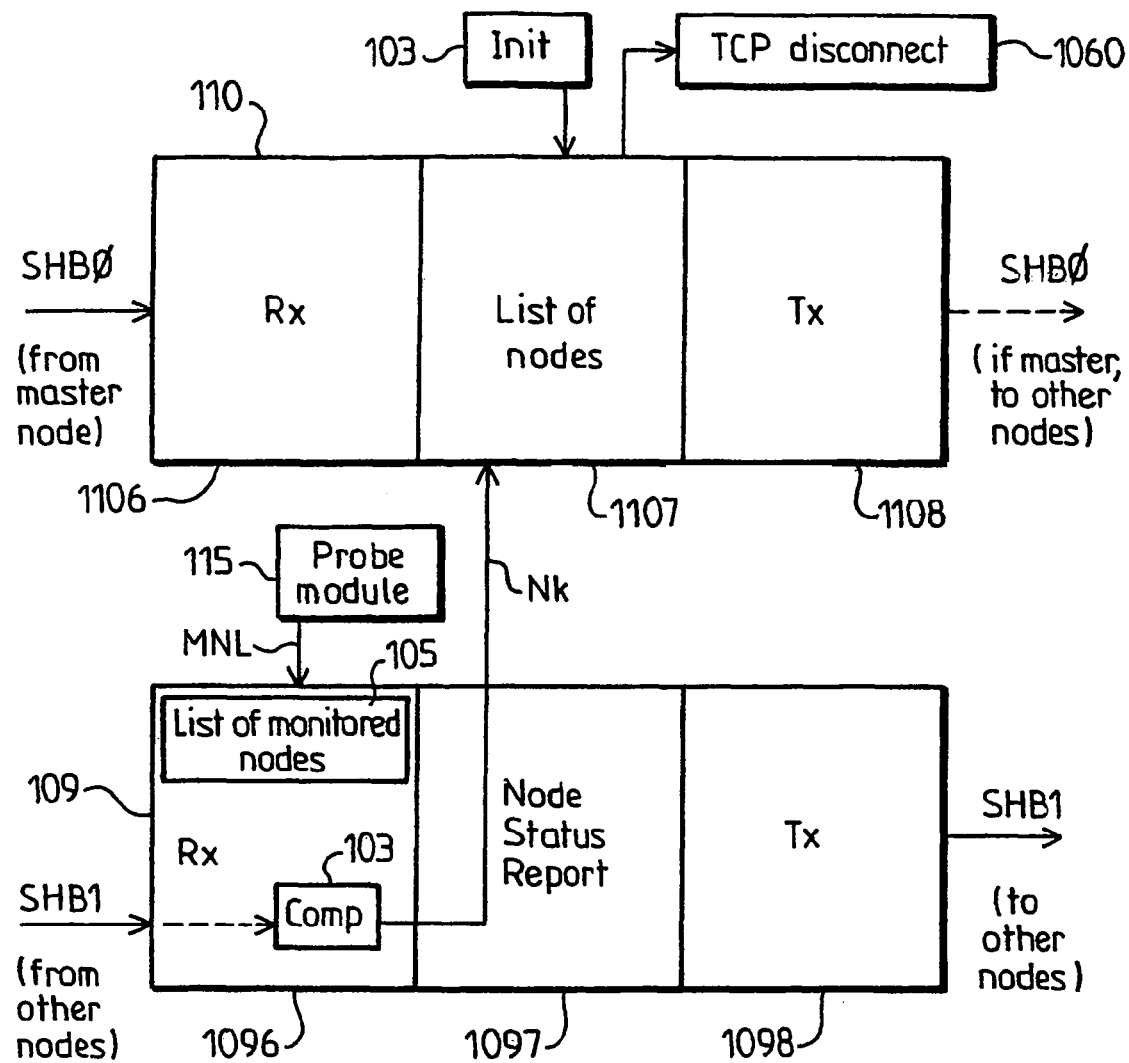
Figure 13:
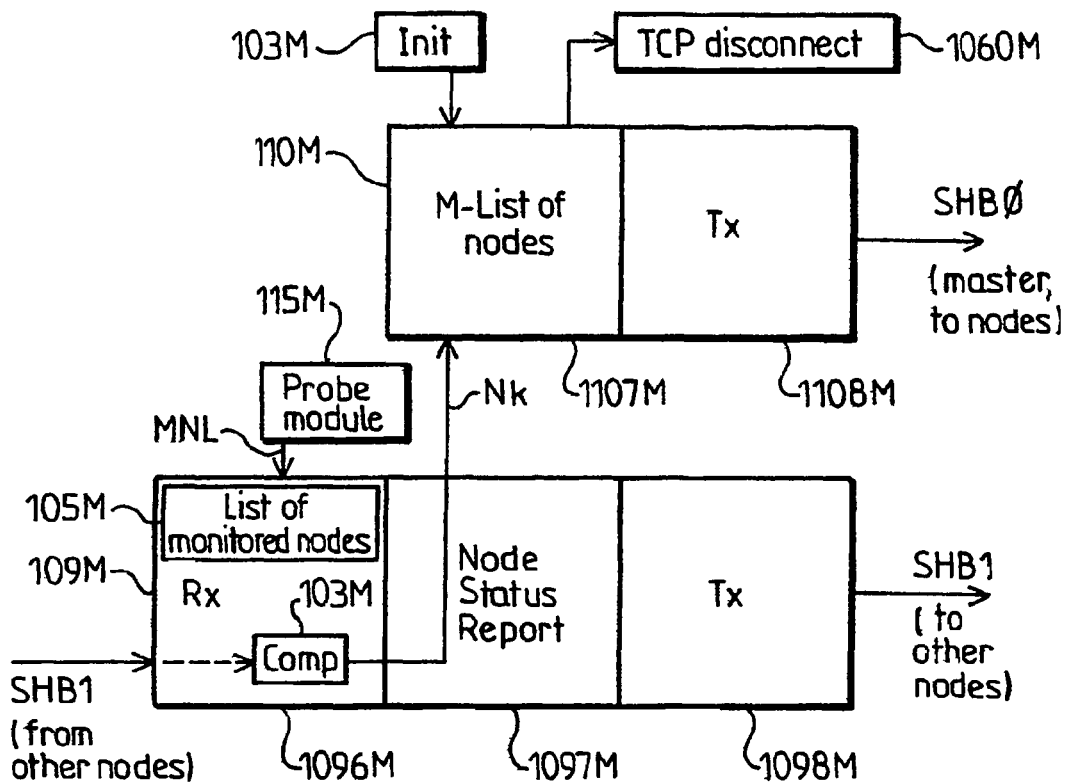
Figure 14:
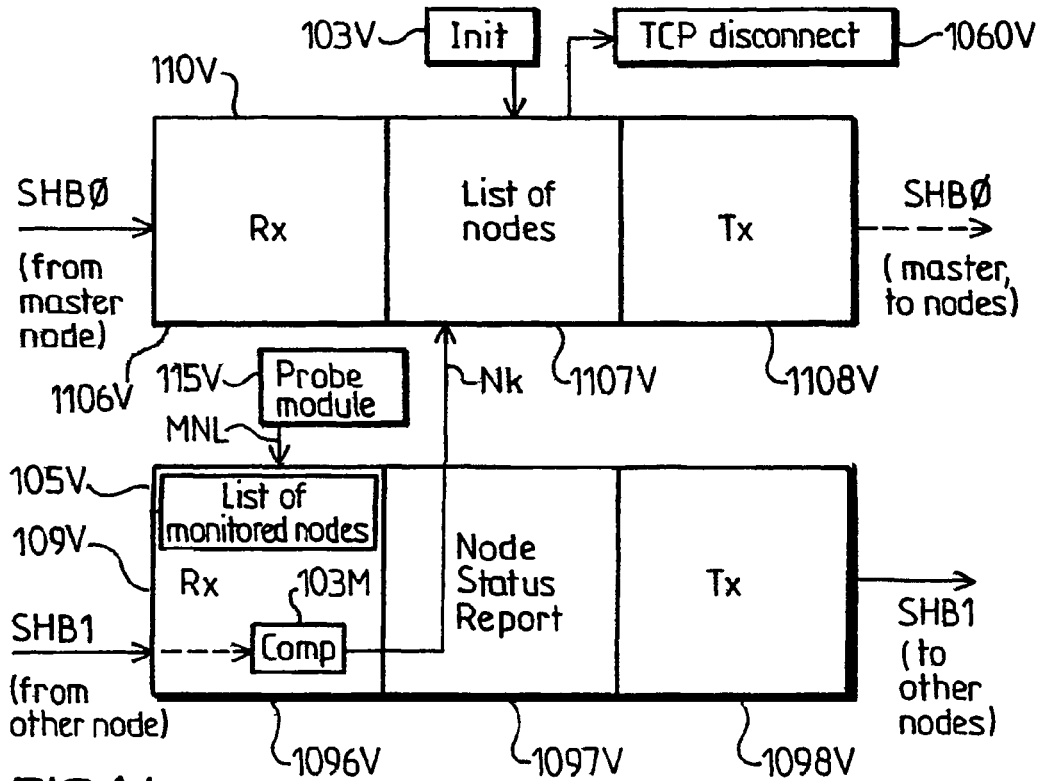
Figure 15:
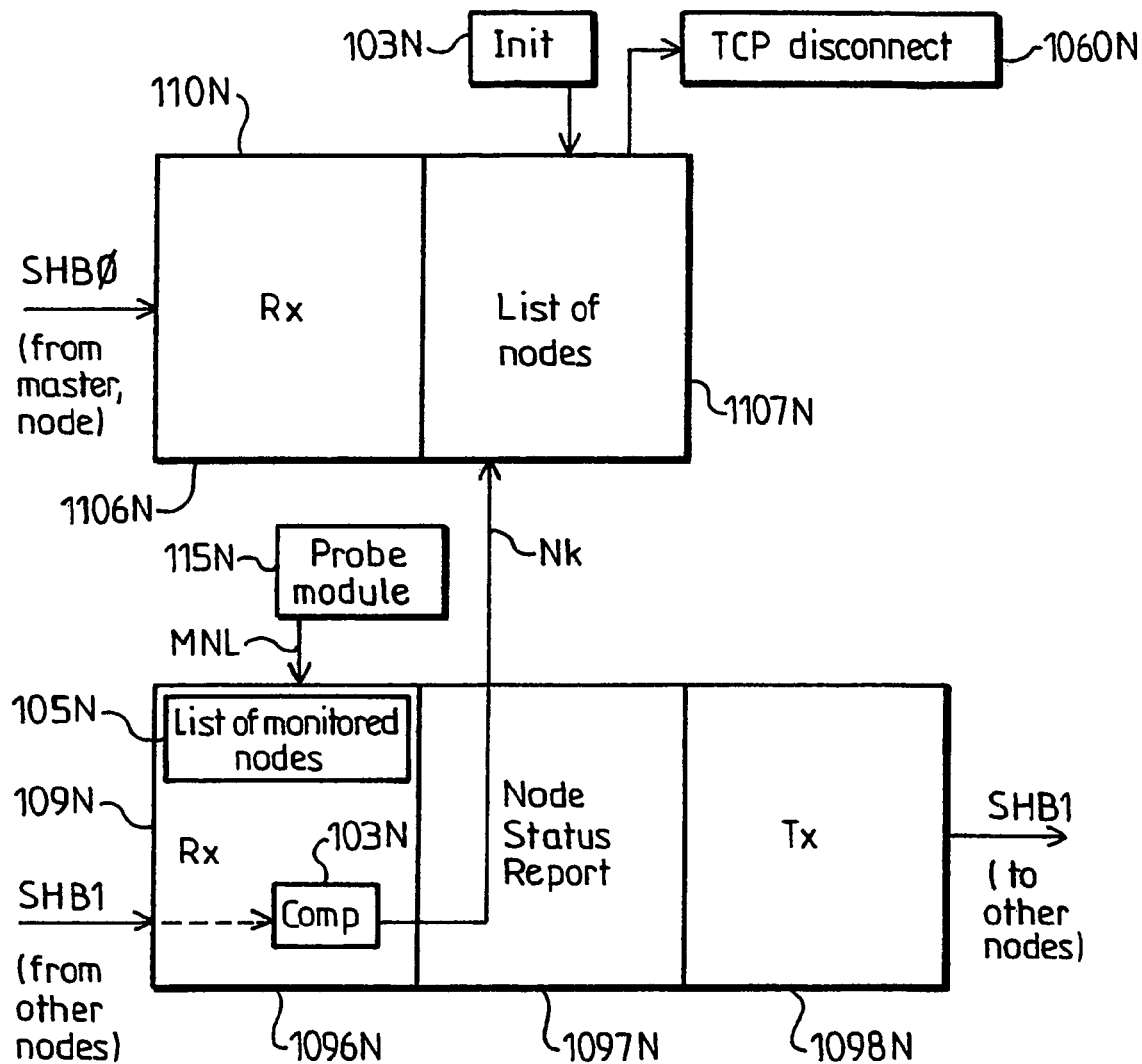
Figure 16:
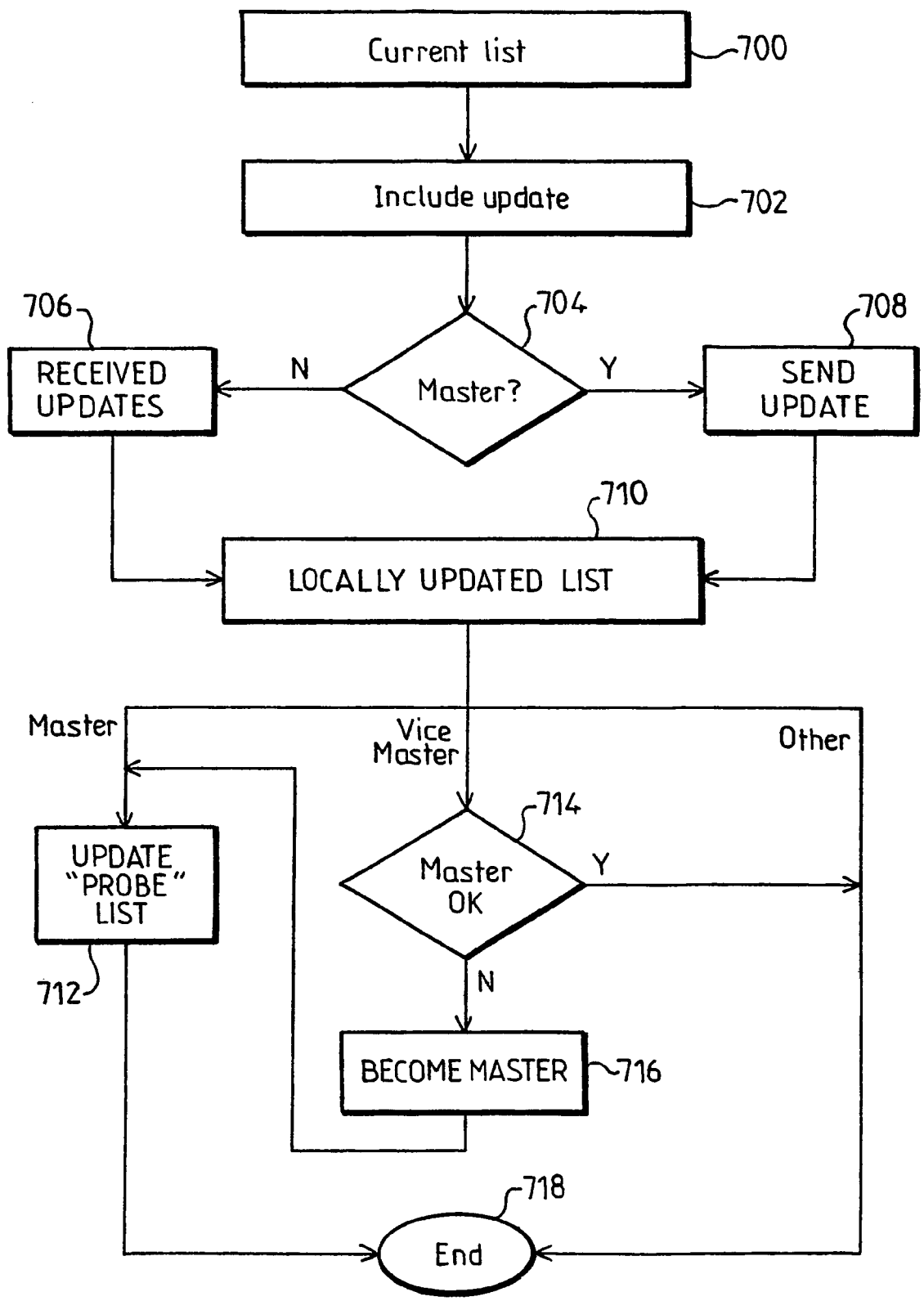

Other alternative features and advantages of the invention will appear in the detailed description below and in the appended drawings, in which:

FIG. 1 is a general diagram of a computer system in which the invention is applicable;
FIG. 2 is a general diagram of a monitoring platform;
FIG. 3 is a partial diagram of a monitoring platform;
FIG. 4 is a first part of a master election flow-chart;
FIG. 5 is a second part of the master election flow-chart;
FIG. 6 is a third part of the master election flow-chart;
FIG. 7 is a fourth part of the master election flow-chart;
FIG. 8 is a detail of the fourth part of the master election flow-chart;
FIG. 9 is a fifth part of the master election flow-chart;
FIG. 10 is a sixth part of the master election flow-chart;
FIG. 11 is a seventh part of the master election flow-chart;
FIG. 12 is a general diagram example of node mechanism;
FIG. 13 is a particular diagram example of a master node mechanism;
FIG. 14 is a particular diagram example of a vice-master node mechanism;
FIG. 15 is a particular diagram example of other nodes mechanism;
FIG. 16 is a general flow chart of node mechanism.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Additionally, the detailed description is supplemented with the following Exhibit:

Exhibit I contains pseudo-code useful for the master election.

This Exhibit is placed apart for the purpose of clarifying the detailed description, and of enabling easier reference. It nevertheless forms an integral part of the description of the present invention. This applies to the drawings as well.

This invention also encompasses software code, especially when made available on any appropriate computer-readable medium. The expression "computer-readable medium" includes a storage medium such as magnetic or optic, as well as a transmission medium such as a digital or analog signal.

This invention may be implemented in a computer system, or in a network comprising computer systems. The hardware of such a computer system is for example as shown in FIG. 1, where:

1 is a processor, e.g. an Ultra-Sparc (SPARC is a Trademark of SPARC International Inc);
2 is a program memory, e.g. an EPROM for BIOS;
3 is a working memory, e.g. a RAM of any suitable technology (SDRAM for example);
4 is a mass memory, e.g. one or more hard disks;
5 is a display, e.g. a monitor;
6 is a user input device, e.g. a keyboard and/or mouse; and
7 is a network interface device connected to a communication medium 8, itself in communication with other computers. Network interface device 9 may be an Ethernet device, a serial line device, or an ATM device, inter alia. Medium 8 may be based on wire cables, fiber optics, or radio-communications, for example.

Data may be exchanged between the components of FIG. 1 through a bus system 19, schematically shown as a single bus for simplification of the drawing. As is known, bus systems may often include a processor bus, e.g. of the PCI type, connected via appropriate bridges to e.g. an ISA bus and/or an SCSI bus.

FIG. 1 defines a node according to the invention.

FIG. 2 shows an example of a group of nodes noted N* arranged as a cluster K. The cluster has a master node NM, a vice-master node NV and other nodes N2, N3 . . . Nn−1 and Nn. The qualification as master or as vice-master should be viewed as dynamic: one of the nodes acts as the master (resp. Vice-master) at a given time. However, for being eligible as a master or vice-master, a node needs to have the required "master" functionalities.

References to the drawings in the following description will use two different indexes or suffixes i and j, each of which may take anyone of the values: {M, V, 2 . . . n}, n+1 being the number of nodes in the cluster.

In FIG. 2, each node Ni of cluster K is connected to a first network via links L1-Ni. A switch S1 is capable of interconnecting one node Ni with another node Nj. If desired, the Ethernet link is also redundant: each node Ni of cluster K is connected to a second network via links L2-Ni and a switch S2 capable of interconnecting one node Ni with another node Nj (in a redundant manner with respect to operation of switch S1). For example, if node N2 sends a packet to node Nn, the packet is therefore duplicated to be sent on both networks. The mechanism of redundant network will be explained hereinafter. In fact, the foregoing description assumes that the second network for a node is used in parallel with the first network.

Also, as an example, it is assumed that packets are generally built throughout the network in accordance with a transport protocol, e.g. the Internet Protocol (IP). Corresponding IP addresses are converted into Ethernet addresses on Ethernet network sections.

In a more detailed exemplary embodiment and according to the Internet Protocol, a packet having an IP header comprises identification data as the source and destination fields, e.g. according to RFC-791. The source and destination fields are the IP address of the sending node and the IP address of the receiving node. It will be seen that a node has several IP addresses, for its various network interfaces. Although other choices are possible, it is assumed that the IP address of a node (in the source or destination field) is the address of its IP interface 100 (to be described).

FIG. 3 shows an exemplary node Ni, in which the invention may be applied. Node Ni comprises, from top to bottom, applications 13, management layer 11, network protocol stack 10, and Link level interfaces 12 and 14, respectively connected to network links 31 and 32 (corresponding to the switches of FIG. 2) . Node Ni may be part of a local or global network; in the foregoing exemplary description, the network is an Ethernet network, by way of example only. It is assumed that each node may be uniquely defined by a portion of its Ethernet address. Accordingly, as used hereinafter, "IP address" means an address uniquely designating a node in the network being considered (e.g. a cluster), whichever network protocol is being used. Although Ethernet is presently convenient, no restriction to Ethernet is intended.

Thus, in the example, network protocol stack 10 comprises:
an IP interface 100, having conventional Internet protocol (IP) functions 102, and a multiple data link interface 101,
above IP interface 100, message protocol processing functions, e.g. an UDP function 104 and/or a TCP function 106.

When the cluster is configured, nodes of the cluster are registered at the multiple data link interface 101 level. This registration is managed by the management layer 11.

Network protocol stack 10 is interconnected with the physical networks through first and second Link level interfaces 12 and 14, respectively. These are in turn connected to first and second network channels 31 and 32, via couplings L1 and L2, respectively, more specifically L1-*i* and L2-*i* for the exemplary node Ni. More than two channels may be provided, enabling to work on more than two copies of a packet.

Link level interface 12 has an Internet address <IP_12> and a link level address <<LL_12>>. Incidentally, the doubled triangular brackets (<< . . . >>) are used only to distinguish link level addresses from global network addresses. Similarly, Link level interface 14 has an Internet address <IP_14> and a link level address <<LL_14>>. In a specific embodiment, where the physical network is Ethernet-based, interfaces 12 and 14 are Ethernet interfaces, and <<LL_12>> and <<LL_14>> are Ethernet addresses.

IP functions 102 comprise encapsulating a message coming from upper layers 104 or 106 into a suitable IP packet format, and, conversely, de-encapsulating a received packet before delivering the message it contains to upper layer 104 or 106.

In redundant operation, the interconnection between IP layer 102 and Link level interfaces 12 and 14 occurs through multiple data link interface 101. The multiple data link interface 101 also has an IP address <IP_10>, which is the node address in a packet sent from source node Ni.

References to Ethernet are exemplary, and other protocols may be used as well, both in stack 10, including multiple data link interface 101, and/or in Link level interfaces 12 and 14.

Furthermore, where no redundancy is required, IP layer 102 may directly exchange messages with anyone of interfaces 12,14, thus by-passing multiple data link interface 101.

Now, when circulating on any of links 31 and 32, a packet may have several layers of headers in its frame: for example, a packet may have, encapsulated within each other, a transport protocol header, an IP header, and a link level header.

When sending a packet on the network, the IP interface 100 of node Ni will duplicate this packet. Both duplicates have the IP address IP_10(*j*) of a destination node Nj as a destination address and the IP address IP_10(*i*) of the current node Ni as a source address. Internally to protocol stack 10:
a routing table contains information enabling to reach IP address IP_10(*j*) using two different routes (at least) to Nj, going respectively through distant interfaces IP_12 (*j*) and IP_14(*j*);
link level decision mechanisms decide which route passes through local interfaces IP_12(*i*) and IP_14(*i*).
an address resolution protocol (e.g. the ARP of Ethernet) may be used to make the correspondence between the IP address of a link level interface and its link level (e.g. Ethernet) address.

Each duplicate copy of the packet is sent to the interface as determined above: IP interface 100 adds to one duplicate a link level header (link level encapsulation) containing the link level address LL_12(*j*), and sends it through e.g. LL_12(*i*). Similarly, the other duplicate is provided with a link level header containing the link level address LL_14(*j*), and sent through e.g. LL_14(*i*).

Conversely, when receiving a packet from the network, the Link level interface 12-*j* (or 14-*j*) will de-encapsulate the packet, thereby removing the link level header (and address), and pass it to protocol stack 10(*j*), which thus normally receives two identical copies of the IP packet.

Amongst various transport internet protocols, the messages may use the Transmission Control Protocol (TCP), when passing through function or layer 106. Transmission Control Protocol has its own capability to suppress redundant packets but with long and unpredictable delays. The messages may also use the User Datagram Protocol (UDP), when passing through function or layer 104. User Datagram Protocol relies on application's capability to suppress redundant packets, in the case of redundancy.

To provide a transport protocol independent filtering at reception side, the IP interface 100 comprises a filtering module to detect and reject redundant packets.

At reception side, packets (comprising packets and their redundant packets) are directed through the Link level interfaces 12 and 14. Packets are then directed to the network protocol stack 10.

Besides, data exchanged with applications layer 13 will of course be conveyed by layer 11 to IP function 102 of layer 10 in accordance with the UDP or TCP protocol (or another protocol, in desired). At sending side, if a packet with a non Internet protocol is submitted to the IP interface 100, this will result into an error.

It will be appreciated that layers 10 and 11 comprise components to provide a highly available link with application layer 13 running on the node. Thus, the management layer 11 comprises an application manager, e.g. a Component Role and Instance Manager (CRIM).

The management layer 11 also comprises a management and monitor entity of the node in the cluster, e.g. a Cluster Membership Monitor (CMM).

All configuration information of nodes may be stored in a specific repository of the cluster, named e.g. the Cluster Configuration Repository (CCR) which may be read using Lightweight Directory Access Protocol (LDAP), accessible from all nodes as this repository is a distributed service and thanks to specific servers in some nodes, named e.g. Cluster Configuration Repository servers which may be Lightweight Directory Access Protocol (LDAP) servers. If a new node is inserted in the system, the node is booted according to its software load configuration parameters. This new node has to be configured as a member of the cluster in the specific repository of the cluster (CCR) to join the cluster.

In each cluster, a master node is firstly elected as described hereinafter according to an election process.

The master and vice-master nodes of the cluster are to be designated initially and at every boot of the system amongst nodes of the cluster. The flow-charts of FIGS. 4, 5, 6, 7, 8, 9, 10 and 11 illustrate the election process for the master and the vice-master nodes. The flow-charts are used asynchronously in nodes of the cluster. Exhibit I provides, from real code in C, pseudo-code in natural language which represents algorithms illustrated in these flow-charts.

In a cluster, one of the nodes has to be elected to have a specific administrative role as a master for the platform, and another node has to be elected to operate as a vice master node to the master node and to replace it in case of master node's failure.

In the hereinafter description, a node is considered to be master-eligible when it has the required functionalities. In an embodiment including redundancy, a master-eligible node may be also considered as a vice-master eligible node. Thus, one requirement for a node to be master-eligible may be a diskfull node. Another requirement to be a master-eligible node may be a node having a specific server to retrieve information on a specific configuration, e.g. CCR which may be LDAP.

In a purely exemplary cluster, there are two diskfull nodes and the other nodes of the cluster are diskless. In a particular embodiment, the cluster may support more than two diskfull nodes. This may be part of configuration information, which may be stored in the specific repository, named e.g. the Cluster Configuration Repository (CCR).

As cluster diskless nodes may not be master-eligible, they may not function when no master node is elected. In the hereinafter description, a master-eligible node is also a vice-master eligible node.

The FIGS. 4 to 11 represent the election algorithm election split into several threads. Threads may start asynchronously as the election algorithm is composed of independent threads. In FIG. 4, the election algorithm starts at operation 900 in all nodes of the cluster. Then, a start-up script starts the management and monitor entity (CMM) of the node. When the management and monitor entity starts, it uses local configuration information to determine whether the node is mastereligible or not. Thus, each node determines if it can be candidate to become the master node, or the vice-master node if redundancy is desired from the beginning, at operation 902.

If the management and monitor entity (CMM) determines that the node is not master-eligible, the node initializes a satellite role, that is to say the node status is to be an ordinary node, in operation 903. The election process ends at operation 904 for ordinary nodes.

If the management and monitor entity (CMM) determines that the node is master-eligible, the node starts a list of candidate nodes of the cluster by adding its own node identification in the list in operation 905. Then, this node sends a "candidate master" message to all nodes of the cluster in operation 906. This "candidate master" message contains all information relevant to this node, and particularly the node identification (my-id). The node starts a T1 timer to wait for other candidate nodes to signal their availability in operation 908. In other words, the T1 timer permits to wait for "candidate master" messages from other nodes of the cluster.

In FIG. 5, a cluster node receives, from a candidate node, a "candidate master" message with identification of said candidate node in operation 960. This node identification is added to the list of candidate nodes in operation 962. Thus, the list of candidate nodes is a list of currently running candidate nodes.

In FIG. 6, when a T1 timer is detected to expire in a cluster node in operation 912, it means the time to receive other "candidate master" messages is over. The list of candidate nodes is closed and the management and monitoring entity (CMM) of the node determines on criteria taking into account initialization conditions and recent history, if any, the best potential master node of the list to designate a potential master node in best choice and a vice-master node in second best choice in operation 913. A "potential master" message comprises these best and second best choices and is sent to all nodes of the cluster in operation 914. In the node, if the potential master is detected to designate the "my-id" identification in operation 915, it means the present node is the potential master node.

In this case, the node starts a T2 timer to wait for "counterproposal" message to this potential master node in operation 917.

Else, the node starts a T3 timer to wait for an "Elected master" message from another node of the cluster in operation 916. In other words, the node waits for a message indicating the proposed node has accepted the master role.

A first booted node is the first node (N1) of the cluster that elects a potential master node among the candidate nodes. Thus, the N1 node starts first and receives all the candidate nodes advertisements. It is the only node having the complete list of candidates and is able to choose the best candidate. Two nodes may also be booted at the same time as seen hereinafter.

In FIG. 7, when the node receives a "potential master" message in operation 932, it cancels, if they are active, T1, T2, T3 timers in operation 934.

There may be two booted nodes at the same time. At operation 932, if "Potential master" message ("received-proposal") is received in a node according to the sub-process of FIG. 6 and a "Potential master" message has already been chosen by said node in operation 913 of FIG. 6 ("my-proposal") at operation 968 of FIG. 7, the node has to check if the two messages differ in their potential master node at operation 969.

At operation 968, if both messages have the same potential master node, FIG. 7 continues with operation 935. In the node, if the "potential master" message received is detected to designate the "my-id" identification as the potential master node in operation 935, it means the present node is the potential master node.

In this case, the node starts a T2 timer to wait for "counterproposal" message to this potential master node in operation 937.

Else, the node starts a T3 timer to wait for an "Elected master" message from another node of the cluster in operation 936. In other words, the node waits for a message indicating the proposed node has accepted the master role.

At operation 968, if the two messages differ in their potential master node ("conflict"), operation 970 proposes a "conflict resolution" developed in FIG. 8.

In FIG. 8, the node chooses the best potential master between the candidate nodes "my-proposal" and "received-proposal" at operation 971, according to election criteria taking into account initialization conditions and recent history, if any. If the chosen potential master is the "received-proposal", then operation 974 returns to operation 935 in FIG. 6. Otherwise, the node sends its "potential master" message designating "my-proposal". In the node, if the potential master is detected to designate the "my-id" identification in operation 975, it means the present node is the potential master node.

In this case, the node starts a T2 timer to wait for "counterproposal" message to this potential master node in operation 977.

Else, the node starts a T3 timer to wait for an "Elected master" message from another node of the cluster in operation 976. In other words, the node waits for a message indicating the proposed node has accepted the master role.

In FIG. 9, when a T3 timer is detected to expire in a cluster node in operation 920, it means no "Elected Master" message has been received within time period T3. This means that the proposed master has not accepted the master role for some reason, very likely a failure. Then, the list of candidate nodes is updated by cancelling the node identification of the previous potential master node in operation 922. Then, the management and monitoring entity (CMM) determines a new best potential master node in the updated list to designate a potential master in operation 923. A "potential master" message is sent to all nodes of the cluster in operation 924. In the node, if the potential master node is detected to designate the "my-id" identification in operation 925, it means the present node is the potential master node.

In this case, the node starts a T2 timer to wait for a possible "conflict resolution", which will return into a "counter-proposal" message to this potential master node proposal in operation 927.

Else, the node starts a T3 timer to wait for an "Elected master" message from another node of the cluster in operation 926. In other words, the node waits for a message indicating another node has been elected master node.

In FIG. 10, when the T2 timer expires in operation 950, it means that no node has detected a better potential master node than the present node. In other words, no node has sent a "potential master" message as counter-proposal to the "potential master" message of the node. Thus, the node sends a "Elected Master" message with the "my-id" identification of the node to all node of the cluster in operation 952. In other words, this node sends a message meaning it takes the master role. This message also nominates the vice-master node.

In FIG. 11, the nodes receive a "Elected Master" message from the node elected as the master node in operation 940. The management and monitor entity (CMM) cancels, if they are active, T1, T2, T3 timers in operation 941.

If the "Elected Master" message designates the present node as the master node in operation 942, then the present node starts its master role in operation 943.

Else, if the "Elected Master" message designates the present node as the vice-master node in operation 944, then the present node starts its vice-master role in operation 945.

Else, the present node starts its satellite role in operation 946.

After operations 943, 945 and 946, the election process ends at operation 948.

In an embodiment, messages sent to all nodes are broadcast messages. In another embodiment, messages send to all nodes are multicast messages.

If no candidate node exists, the full startup sequence of the platform is in waiting state, for example it waits for an action that will lead to a new election. The nodes initialize and wait for a master. An error may be notified to the management layer 11. When executing operations in one of the flow charts of FIGS. 4 to 11, pursuant to the arrival of a new event, e.g. an incoming SHB0 message (to be described), another corresponding algorithm may be executed.

A vice-master node may be assigned in the "Elected master" message of the master node. Moreover, several vice-master nodes may be assigned in this message. In other words, the master node decides about the vice-master node or nodes election. Alternatively, the master node, when elected, may directly designate one or more vice-master nodes.

The method to choose the best master node is independent of the election process. The relevant information needed for criteria for best master node election are sent with "candidate master" messages. Thus, the criteria are based on:
the node which was the master last time, if it is not the first election;
the most up-to date copy of local configuration information (CCR, which may be LDAP) of the node;
optionally NVRAM (Non-Volatile RAM) information if no other agreement can be found.

Once the master node is elected, the specific server (CCR server which may be LDAP server) on that node is regarded as the definitive source for information, in other words the main server. The specific server of the vice-master node is placed in replica mode and takes updated information from the main server as described hereinafter.

Another node failure handling may also be done in another embodiment of the invention.

It is now recalled that a whole network system may have a plurality of clusters, as above described. In each cluster, there exists a master node (of a main sub-cluster) which may have a distinctive structure to ordinary nodes as described hereinafter.

FIG. 12 illustrates an implementation of the invention in a general node. FIGS. 13, 14, 15 show specific implementation examples of the invention respectively in a master node (NM), vice-master node (NV) and other nodes (N).

A failure detection module 109 is implemented at kernel level within the operating system, at the IP layer 102 of FIG. 3.

Management and monitor entity 110 (Cluster Membership Management) uses at least a probe module 115. Management and monitor entity 110 and probe module 115 may be implemented at the user level or at a kernel level in the operating system.

According to the invention, specific messages are exchanged between nodes using a standard heart beat mechanism and therefore are named Standard Heart Beat (SHB). Specific messages may be "presence messages" SHB 1 and "master messages" SHB0. A "presence message" is sent from a given node to other nodes to declare the status of a given node, in other words to declare that the given node is in working state. If no presence message is sent from a given node, the given node is considered to be potentially out of working state. A "master message" is sent from the master to other nodes to transmit the cluster identification, the version, an updated list of cluster nodes and their status, this list comprising information specifying the master and vice-master node and their status. In the further description, P0 and P1 are periods of time given in seconds defining the standard heart beat mechanisms.

The failure detection module 109 is adapted to exchange spontaneously, each P1, multicast presence messages SHB1 with other failure detection modules 109 of other nodes in the cluster. These exchanges may also be broadcast presence messages SHB1 exchanges.

The period of time P1 may be equal to less than 1 second, for example to 0.1 second. The failure detection module 109 comprises a message SHB1 reception module 1096, a message SHB1 transmission module 1098.

Management and monitor entity 110 (Cluster Membership Management) is adapted to register and update the list of cluster nodes in a list memory 1107. The Init module 103 may reset the list when necessary. Moreover, in the master node, the management and monitor entity 110 is adapted to transmit, each P0 seconds, the master messages SHB0 from the transmission module 1108 to other nodes. In other nodes than the master node, the management and monitor entity 110 is adapted to receive the master messages SHB0 in the reception module 1106. The mechanism may be a heart beat mechanism. P0 may be in the order of some seconds, for example 5 seconds.

Management and monitor entity 110, via a probe module 115, is adapted to transmit regularly the Monitored Nodes List (MNL) to the failure detection module 109. This Monitored Nodes List (MNL) comprises the list of cluster nodes monitored by the present node. As further described, this list is specific to the present node type (master, vice-master or ordinary nodes).

In the failure detection module 109, this Monitored Nodes List is compared to the received present messages SHB1 in the compare module 103. In the received present messages SHB1, if the status of the nodes is detected to be changed comparing with the status of the nodes registered in the Monitored Nodes List, the node status report module 1097 of the failure detection module 109 reports the changes in the list memory 1107 of the node. That is to say, changes in nodes status is reported regularly to management and monitor entity 110. When necessary, e.g. after a determined number of successive no presence message from a given node, management and monitor entity 110 may call a TCP disconnect module 1060 to force in error nodes links of a failure detected node of the cluster.

In FIG. 13, 14 and 15, these module and their corresponding functions are explicitly hereinafter described for different types of nodes in a cluster. N* represents all the nodes of the cluster.

A node is considered to be "active", that is to say in working state, if no successive lack of presence message from this node is detected a determined number of time.

Comparing with an ordinary node in a cluster, the "master" node has the additional capabilities of:
monitoring all cluster nodes,
gathering nodes status information for all cluster nodes,
issuing regularly nodes status information to all cluster nodes.

Thus, in FIG. 13, for a-master node, the management and monitor entity 110M comprises the list memory 1107M to store nodes status information for all cluster nodes, as an updated list of nodes comprising the master and vice-master node status. A transmission module 1108M in the management and monitor entity 110M transmits this updated list of nodes (M-list) to all nodes.

The Monitored Nodes List for the master node comprises a list of all nodes of the cluster except itself (master node): MNL={N*–NM}. Roughly each P1 time, the compare module may detect status changes for nodes Nk comparing the MNL nodes status and the SHB1 nodes status. Nk may be any of the cluster nodes having a change in its status. For the master node, k is a variable taking these values {V, 2 . . . n}, n being the number of nodes in the cluster, without counting the master node. The report module 1097M provides status changes for the nodes Nk to the M-list of nodes in list memory 1107M.

In FIG. 14, for a vice-master node, the management and monitor entity 110V comprises a reception module 1106V to receive the master messages SHB0 with the updated list of nodes comprising the master and vice-master node status, and the list memory 1107V to store these updated nodes status information for all cluster nodes. The vice-master node also comprises a waiting state transmission module 1108V to replace the master node in case of master node failure detection.

The Monitored Nodes List for the vice-master node comprises the master node: MNL={NM}. Roughly each P1 time, the compare module may detect status changes for the master node, comparing the MNL master node status and the. SHB1 master node status. Thus, other nodes than master node in presence messages SHB1 are discarded. In an embodiment of the vice-master node, Nk is the master node having a change in its status. For the vice-master node, k is a variable taking only the value {M}. When detected status change for the master node, the report module 1097V provides status change for the master node to the list of nodes in the list memory 1107V. Then, when the master node is considered to be non active in the list memory 1107V, the vice-master node becomes the master node with its implementation as hereinabove described.

In FIG. 15, for an ordinary node, the management and monitor entity 110N comprises a reception module 1106N to receive the master messages SHB0 with the updated list of nodes comprising the master and vice-master node status, and a list memory 1107N to store these updated nodes status information for all cluster nodes.

The Monitored Nodes List for ordinary nodes comprises the master node: MNL={NM}. Roughly each P1 time, the compare module may detect status changes for the master node, comparing the MNL master node status and the SHB1 master node status. Thus, other nodes than master node in presence messages SHB1 are discarded. In an embodiment of the node, Nk is the master node having a change in its status. For the ordinary node, k is a variable taking only the value {M}. When detected status change for the master node, the report module 1097N provides status change for the master node to the list of nodes in the list memory 1107N. Then, when the master node is considered to be non active in the list memory 1107N, the ordinary node may inform applications of this master node status change. In another embodiment, ordinary nodes may monitor some nodes, the Monitored Nodes List may thus comprise these nodes.

A method called "heart beat protocol" is defined as a failure detection process based on a regular exchange of spontaneous presence messages as a heart beat SHB1, a regular exchange of spontaneous master messages as a heart beat SHB0, and a comparison between presence messages and the Monitored Nodes List (MNL). This list of monitored nodes (MNL) is regularly updated according to the master message.

The transport interface 109N and 109V notifies the transport interface 109M that the nodes are active or not in the presence messages SHB1. This transport interface 109M notifies the management and monitor entity 110M when the nodes are unreachable, in other words not active. In this case, in the master node, a watchdog timer in the middleware may detect application-level failure of an ordinary unreachable node and force a reboot of this unreachable node. This embodiment avoids the management and monitor entities 110N and 110V to constantly inform the management and monitor entity 110M about unreachable nodes. The management and monitor entities 110N and 110V do not have to synchronize between themselves, they only accept the information, i.e. the master messages SHB0, sent by the master node.

As the transport interface 109M of the master node notifies the management and monitor entity 110M when an ordinary node is unreachable, the ordinary node assumes that it is a cluster member until the node identification is not in the received M-list of the master message SHB0 anymore. In this case, the node assumes that the master node is unable to receive its messages, and the node has to reboot.

If a management and monitor entity 110N detects that the master node has failed, it continues operation. This can be detected e.g. if the master message SHB0 comes from a new master node. If, after a timeout, it does not see its node identification in the master messages, it presumes the new master message cannot receive its messages, so the ordinary node has to reboot.

The flow-chart of FIG. 16 illustrates the general management method of failure detection.

In a management and monitor entity of a node, a list memory comprises a current list in operation 700. From a comparison between presence messages SHB1 and the Monitored Nodes List having monitored nodes status from the current list, the current list is updated in operation 702.

If the node is the master node, this updated list is the M-list and the M-list is sent, with a master message SHB0, to all "active" nodes of this list in operation 708. Otherwise, the node receives the M-list with updated nodes status, comprised in a master message SHB0, from the master node in operation 706.

After operation 706 or 708, the list memory is locally updated in nodes other than the master node in operation 710.

For the master node, the Monitored Node List is updated in correspondence with the M-list. Then, the method ends in operation 718.

For the vice-master node, the master message SHB0 conveys partly the master node status and is compared with the master node presence message SHB1. Thus, if the master node is detected in failure, the vice-master node becomes the master node in operation 716. In this case, this new master node modifies its Monitored Nodes List so as to monitor all the nodes of the cluster except itself, and proceeds to other changes to have the features of the new master. If the master node is not detected in failure, the method ends for the vice-master in operation 718.

For ordinary nodes, the method ends in operation 718.

As the method is based on Heart Beat mechanisms, the operation "end" 718 is to be understood as a return to operation 700.

The invention is not limited to the hereinabove described features.

For example, to improve reconfiguration responsiveness to node failures, the management and monitor entity may have a mechanism to allow external entities to inform about a node failure before the heartbeat protocol.

EXHIBIT 1

```
Election
Read minimal configuration from the flat file
if (I am eligible)
    If   (get my_state == DISQUALIFIED || get_my_state==
         FROZEN)
         Return
    else
         Create the election end point
         Add my node to the candidates list
         start election
    endif
endif
Start election
Build a "Candidate" message
Send the "Candidate" message to other CMMs
Arm T1 timer /* wait for Candidates */
Return
Timer T1 expiration
Compute the list of received Candidates + my node information to extract
the best choice and second best choice
Set (my potential = last potential = best choice)
Send Potential
Send Potential
Build a "Potential master" message with my_potential + criteria
         + my second potential
Send the "Potential Master" message to other CMMs
If (my potential == Me)
    Arm T2 timer /*wait for opposition */
else
    Arm T3 timer /* wait for master */
endif
Timer T2 expiration
Build an "Elected Master" message with my node's information
Send the "Elected Master" message to other CMMs
Timer T3 Expiration
Remove last potential from the list of candidates
Compute the list of Candidates to extract best choice + second best
Set (my potential = last potential = best choice)
Send Potential
"Candidate master" Message Received
If (I am not candidate) || (sender = me)
    Return
Endif
Add the Candidate to the list
Return
"Potential Master" Message Received
If (I am not candidate) || (sender = me) || (master elected)
    Return
endif
Cancel T1, T2 and T3 timers
Set (last potential = identity contained in the message)
If unset, set my_second_potential = identity in the message
If (I have sent a "Potential Master" message)
    && (my potential != last potential)
    && (my potential is a better choice)
    Set (last potential = my potential)
    Send Potential
else
    If (last potential== Me)
         Arm T2 timer
    else
         Arm T3 timer
    endif
end if
Return
"Elected Master" Message Received
If (I am not candidate) || (master elected)
    Return
endif
Cancel T1, T2, T3 timers
Set (master elected = TRUE)
If (I am master)
```

```
    Update configuration file
    Start master role
else if (I am vice-master)
    Update configuration file
    Start vice-master role
else
    Update configuration file
    Start candidate role
endif
```

The invention claimed is:

1. A method for determining an elected master of a distributed computer system comprising a plurality of nodes, the method comprising:

sending, by a first node of the plurality of nodes, a candidate master message identifying the first node;

receiving, by the first node, a plurality of candidate master messages from a plurality of candidate masters, wherein each of the plurality of candidate masters are located on one of the plurality of nodes;

identifying, by the first node, a first potential master from a group consisting of the plurality of candidate masters and the first node, wherein the identifying is based on sending the candidate master message and receiving the plurality of candidate master messages;

sending, by the first node, a first potential master message comprising an identification of the first node as the first potential master;

sending, by a second node of the plurality of nodes, a second potential master message comprising an identification of a third node as a second potential master, wherein the third node is different from the first node and different from the second node;

sending, by a fourth node of the plurality of nodes, a third potential master message comprising an identification of the first node as a third potential master, wherein the first node is different from the fourth node;

receiving, by the first node, the second potential master message from the second node and the third potential master message from the fourth node;

selecting, by the first node, according to a conflict resolution process, the first node from a set comprising the first node and the third node, wherein the set comprises the first node based on the first node being the first potential master and the third potential master, and wherein the set comprises the third node based on the third node being the second potential master;

sending, by the first node, according to the conflict resolution process, a fourth potential master message identifying the first node as a best candidate master based on selecting the first node from the set;

receiving, by the second node, the first potential master message and the third potential master message;

selecting, by the second node, according to the conflict resolution process, the first node from the set based on determining that the first potential master message and the third potential master message identify different nodes from the second potential master message;

receiving, by the fourth node, the first potential master message and the second potential master message;

selecting, by the fourth node, according to the conflict resolution process, the first node from the set based on determining that the first potential mater message and the third potential master message identify different nodes from the second potential master message;

sending, by the fourth node, according to the conflict resolution process, a fifth potential master message identifying the first node as the best candidate master based on selecting the first node from the set;

receiving, by the first node, the fifth potential master message;

determining, by the first node, that the best candidate master identified in the fourth potential master message is the same as the best candidate master identified in the fifth potential master message from the fourth node;

sending, by the first node as the elected master, and to the plurality of nodes, an elected master message comprising identification of the first node as the elected master, wherein first node is the elected master only when all nodes agree that the first node is the elected master by the first node receiving potential master messages only identifying the first node after the conflict resolution process; and starting a master role, by the first node, based on the first node being the elected master.

2. The method of claim 1, further comprising:
maintaining a list of the plurality of candidate masters, wherein the list of candidate masters comprises the first node.

3. The method of claim 1, wherein the first potential master message is sent after an expiration of a first time period.

4. The method of claim 1, further comprising:
receiving the elected master message by the third node of the plurality of nodes;
starting a vice master role, by the third node, when an identification of a vice-master in the elected master message specifies the third node; and
starting a satellite role, by the third node, when the identification of the elected master and the identification of the vice-master does not identify the third node.

5. A distributed computer system comprising a plurality of nodes, the plurality of nodes comprising:
a first node configured to:
send a candidate master message;
receive a plurality of candidate master messages from a plurality of candidate masters, wherein each of the plurality of candidate masters are located on one of the plurality of nodes;
identify a first potential master from the plurality of candidate masters;
send a first potential master message comprising identification of the first potential master;
receive, from a second node, a second potential master message comprising an identification of a second potential master, wherein the second potential master message identifies a third node, wherein the third node is different from the first node and different from the second node;
receive, from a fourth node, a third potential master message comprising an identification of a third potential master, wherein the third potential master message identifies the first node;
select, according to a conflict resolution process, the first node from a set comprising the first node and the third node, wherein the set comprises the first node based on the first node being the first potential master and the third potential master, and wherein the set comprises the third node based on the third node being the second potential master;

send, according to the conflict resolution process, a fourth potential master message identifying the first node as a best candidate master based on selecting the first node from the set;
receive, from the fourth node, a fifth potential master message from the fourth node;
determine that the best candidate master identified in the fourth potential master message is the same as the best candidate master identified in the fifth potential master message;
send, by the first node as an elected master, to the plurality of nodes, an elected master message comprising identification of the first node as the elected master, wherein the first node is the elected master exists when all nodes agree that the first node is the elected master by the first node receiving potential master messages only identifying the first node after the conflict resolution process; and
start a master role, by the first node, based on the first node being the elected master;
a second node configured to:
send the second potential master message;
receive the first potential master message and the third potential master message; and
select according to the conflict resolution process, the first node from the set based on determining that the first potential master message and the third potential master message identify different nodes from the second potential master message; and
a fourth node configured to:
send the third potential master message comprising an identification of the first node as the third potential master, wherein the first node is different from the fourth node;
receive the first potential master message and the second potential master message;
select, according to the conflict resolution process, the first node from the set based on determining that the first potential mater message and the third potential master message identify different nodes from the second potential master message; and
sending, by the fourth node, according to the conflict resolution process, the fifth potential master message identifying the first node as the best candidate master based on selecting the first node from the set.

6. The distributed computer system of claim 5, wherein the first node is configured to:
maintain a list of the plurality of candidate masters.

7. The distributed computer system of claim 5, wherein the first potential master message is sent after an expiration of a first time period.

8. The distributed computer system of claim 7, wherein the elected master message is sent after an expiration of a second time period.

9. The distributed computer system of claim 5, the plurality of nodes further configured to:
receive the elected master message by the third node;
start a vice master role, by the third node, when an identification of a vice-master in the elected master message specifies the third node; and
start a satellite role, by the third node, when the identification of the elected master and the identification of the vice-master does not identify the third node.

10. The method of claim 3, wherein the elected master message is sent after an expiration of a second time period.

* * * * *